3,770,773
ANTIFUNGAL 2-(1,4-DIOXOCIN-6-YL)-4H-PYRAN-4-ONE AND A METHOD FOR ITS PRODUCTION
Donald Bruce Borders, Suffern, N.Y., and John Edgar Lancaster, Riverside, Conn., assignors to American Cyanamid Company, Stamford, Conn.
No Drawing. Filed July 17, 1972, Ser. No. 272,280
Int. Cl. C07d 21/00
U.S. Cl. 260—338      2 Claims

ABSTRACT OF THE DISCLOSURE

This disclosure describes 2-(1,4-dioxocin-6-yl)-4H-pyran-4-one, a new compound which exhibits antifungal activity and which is prepared by rearrangement of 2-(3,8 - dioxatricyclo[5.1.0.0$^{2,4}$]oct-5-en-5-yl)-4H-pyran-4-one.

BRIEF SUMMARY OF THE INVENTION

This invention relates to a new antifungal compound, 2-(1,4-dioxocin-6-yl)-4H-pyran-4-one (II), which is prepared by the rearrangement of 2 - (3,8 - dioxatricyclo-[5.1.0.0$^{2,4}$]oct-5-en-5-yl)-4H-pyran-4-one (I) as set forth in the following reaction scheme:

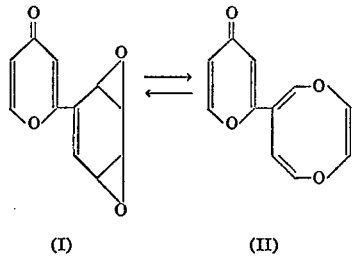

(I)                    (II)

The invention includes within its scope the antifungal compound in dilute forms, as crude concentrates, and in pure crystalline form as well as methods of preparing the antifungal compound.

DETAILED DESCRIPTION OF THE INVENTION

The 2-(3,8 - dioxatricyclo[5.1.0.0$^{2,4}$]oct - 5 - en-5-yl)-(4H)-pyran-4-one starting material (I) is formed during the cultivation under controlled aerobic conditions of an undetermined filamentous fungal species which was isolated from a soil sample. A viable culture of the organism has been deposited with the Culture Collection Laboratory, Northern Utilization Research and Development Division, United States Department of Agriculture, Peoria, Ill. and has been added to its permanent collection under its accession number NRRL 3938.

Culture NRRL 3938 was grown on several diagnostic media which normally support good growth and sporulation of fungal cultures. Culture NRRL 3938 exhibited good mycelial development, but failed to produce spore types useful for taxonomic purposes. It did, however, produce abundant chlamydospores, but these are of little diagnostic value since they are commonly produced by a diversity of organisms. In the absence of suitable taxonomic criteria for finite indentification, the organisms will have to remain an undetermined chlamydospore-producing fungal species. Following is a detailed description of culture NRRL 3938.

Cultures on malt extract agar spreading rapidly, covering the Petri dish in 14 days. Growth grayish-white, thin, heaviest in central zones; reverse yellowish, Mycelium separate, 3–4µ in diameter, becoming thicker (6–8µ) with age. Chlamydospores produced abundantly both terminally and intercallary, mostly globose, ranging from 6–24µ in diameter, averaging about 15µ. No other spore types produced.

Cultures on potato dextrose agar spreading rapidly, covering the Petri dish in 14 days. Growth yellowish-white, thin, becoming strongly zonate in wide bands. Reverse yellowish-brown. Chlamydospores formed as on malt extract agar. No other spore types produced.

Cultures on Czapek's solution agar effuse, covering the Petri dish in 14 days. Growth colorless, very thin, reverse also colorless. Occasional chlamydospores formed. No other spore types observed.

Cultures on corn meal agar effuse, spreading rapidly, covering the Petri dish in 14 days. Growth whitish, very thin, reverse whitish. Chlamydospores produced sparingly. No other spore types produced.

It is to be understood that for the production of the starting material (I), 2-(3,8-dioxatricyclo[5.1.0.0$^{2,4}$]oct-5-en-5-yl)-4H-pyran-4-one, the present invention is not limited to this particular organism only, nor to organisms fully answering the above growth and microscopic characteristics which are given for illustrative purposes. In fact, it is desired and intended to inlude the use of mutants produced from the described organism by various means such as X-radiation, ultraviolet radiation, nitrogen mustard, phage exposure, and the like.

Cultivation of the organism NRRL 3938 may be carried out in a wide variety of liquid culture media. Media which are useful for the production of the starting material (I) include an assimilable source of carbon such as starch, sugar, molasses, glycerol etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc. are supplied as impurities of other constituents of the media. Aeration is provided by forcing sterile air through or onto the surface of the fermenting medium. Agitation is provided by a mechanical impeller. An antifoaming agent such as 1% octadecanol in lard oil may be added as needed.

Inoculum is prepared by inoculating portions of sterile liquid medium with scrapings or washings of spores from an agar slant of culture NRRL 3938. The following medium may be used:

|   | Gm./liter. |
|---|---|
| Soybean meal | 10 |
| Glucose | 20 |
| Corn steep liquor | 5 |
| Calcium carbonate | 3 |
| Water, q.s. to 1 liter. | |

The inoculated medium is incubated at 24°–30° C. under aeration for 48–72 hours. Two hundred milliliter portions are used to inoculate 12-liter batches of the same medium in a 20-liter glass fermentor. The inoculum mash is aerated with sterile air while growth is continued for 48–72 hours. This in turn is used to inoculate a tank fermentor.

The inoculum, prepared as described above, is used to seed the following fermentation medium in tank fermentors:

|   | Gm./liter |
|---|---|
| Cane molasses | 20 |
| Glucose | 10 |
| Soy flour | 10 |
| Corn steep liquor | 5 |
| Calcium carbonate | 3 |
| Water, q.s. to 1 liter. | |

Each tank is inoculated with 3% to 10% of inoculum prepared as described above. Aeration is supplied at the rate of 0.5–1.0 liter of sterile air per liter of mash per minute and the fermenting mixture is agitated by an impeller driven at 200–400 r.p.m. The temperature is maintained at 25°–30° C., usually at 28° C. The fermentation is continued for 120–160 hours and then harvested.

The harvested mash is filtered and the filtrate is adjusted to pH 7.0 with dilute sodium hydroxide and extracted with chloroform. The resulting extract is concentrated to dryness under reduced pressure. The residual mass is dissolved in chloroform. The solution is mixed with acetone and chilled. The crystalline 2-(3,8-dioxatricyclo[5.1.0.0$^{2,4}$]oct-5-en-5-yl)-4H-pyran-4-one which separates is filtered off, washed with acetone, and dried in vacuo at room temperature.

When the starting material (I) is heated in acetic anhydride it rearranges to the antifungal (II) which has the same molecular formula as the starting material. The optimal conditions for this rearrangement are heating for about 50 minutes at about 95° C. This product (II) gave a negative test for epoxide groups, was stable at room temperature, and could be sublined in vacuo. The structure for (II) was derived essentially from spectroscopic data.

The high resolution mass spectrum has a parent ion which corresponds to a molecular formula of $C_{11}H_8O_4$. This is consistent with the NMR spectrum which clearly indicates eight protons none of which exchange in the presence of $CD_3OD$. The lowest field proton has a chemical shift and splitting ($\delta 7.81$) similar to the pyrone moiety of (I); however, the other pyrone protons of (II) appear as a complex two-proton multiplet at $\delta 6.38$. Spin decoupling studies established the coupling of the low field proton with the multiplet at $\delta 6.38$ and the NMR spectrum with rare earth shift reagents resolved this multiplet into the typical two-proton pattern anticipated for the $\beta$-protons of the $\alpha$-substituted pyrone.

The product (II) had IR absorption near 1652 cm.$^{-1}$ as would be expected for a $\gamma$-pyrone. Thus it was evident that the rearrangement had not affected the $\alpha$-substituted $\gamma$-pyrone moiety of (I).

The remaining $C_6H_5O_2$ portion of (II) gave NMR adsorption of a 1-proton singlet at $\delta 7.33$ and two sets of 1-proton doublets: $\delta 6.00$ and $\delta 6.08$ with $J=4.1$ $H_z$, $\delta 5.55$ and $\delta 6.8$ with $J=6.8$ $H_z$. These coupling patterns were confirmed by the decoupling study which also had established the pattern of the $\gamma$-pyrone ring.

Investigation of the $^{13}CH$ satellite NMR spectrum of (II) indicates that the high field protons, $H_b$, $H_c$ and $H_e$, were olefinic from the magnitude of the $^{13}CH$ coupling constants (192, 196 and 161 $H_z$ respectively). The chemical shift and coupling constants from the proton spectrum indicated that $H_a$ and $H_d$ were also olefinic protons.

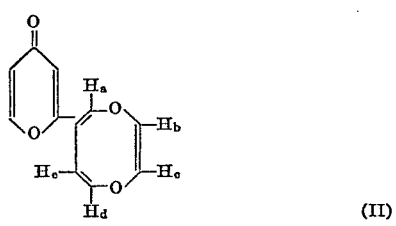

(II)

The conversion of (II) back to (I) containing the benzene dioxide ring can be accomplished readily by heating (II) in an inert solvent such as ethyl acetate. Ethyl acetate is most effective since (II) is readily soluble, whereas (I) is relatively insoluble and crystallizes out on cooling. The reformed (II) is optically inactive, indicating a racemic mixture since the original starting material has $\alpha_D$-123° C.

The novel compound of the present invention is useful as an antifungal agent and possesses broad-spectrum antifungal activity in vitro against a variety of standard laboratory microorganisms as determined by the agar-dilution streak-plate technique. In this assay, the compound to be tested is made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, and then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. The minimal inhibitory concentration (expressed in micrograms per milliliter) is defined as the concentration of test compound causing complete inhibition of growth of any particular organism.

2-(1,4-dioxocin-6-yl)-4H-pyran-4-one (II) has clearly established antifungal activity. The in vitro activity of this new antifungal is presented in Table I which shows the minimal inhibitory concentration (MIC) required to inhibit the growth of representative microorganisms in a nutrient medium.

Table I

| Organism: | MIC (mcg./ml.) |
|---|---|
| Candida albicans 300(E83) | 100 |
| Cryptococcus neoformans SP (E138) | 50 |
| Microsporum canis ATCC 10214(E55) | 10 |
| Microsporum gypseum ATCC 14683 (E130) | 25 |
| Phialophthora jeanselmei NIH 8724(E16) | 100 |
| Trichophyton tonsurans NIH 662 (E10) | 10 |
| Trichophyton mentagrophytes (E11) | 10 |
| Trichophyton rubrum (E97) | 25 |

This novel antifungal agent can be used as an additive to materials which are subject to fungal deterioration. It can also be added to foot or hand rinse solutions used to prevent the spread of fungi causing topical infections in humans and in animals.

The invention will be described in greater detail in conjunction with the following specific examples.

EXAMPLE 1

Inoculum preparation

A typical medium used to grow the inoculum was prepared according to the following formula:

| | Gm./liter |
|---|---|
| Soy flour ×200 | 10 |
| Glucose | 20 |
| Corn steep liquor | 5 |
| Calcium carbonate | 3 |
| Water, q.s. to 1 liter. | |

Scrapings from an agar slant of culture NRRL 3938 were used to inoculate two 500 ml. flasks each containing 100 milliliters of the above sterile medium. The flasks were placed on a rotary shaker and agitated vigorously for 48 hours at 28° C. The resulting flask inoculum was transferred to a 20 liter glass fermentor containing 12 liters of the above sterile medium. The glass fermentor was aerated with sterile air while growth was carried out for 48 hours at 28° C. after which the contents were used to seed a 300 liter tank fermentor.

EXAMPLE 2

Fermentation

Twelve liters of inoculum prepared as described in Example 1 was used to seed 300 liters of medium of the following formulation:

| | Gm./liter |
|---|---|
| Cane molasses | 20 |
| Glucose | 10 |
| Soy flour (×200) | 10 |
| Corn steep liquor | 5 |
| Calcium carbonate | 3 |
| Water, q.s. to 1 liter. | |

The fermentation was carried out at 28° C. for 140 hours. Aeration was supplied at the rate of 0.5 liters of sterile air per liter of mash per minute. The mash was agitated by an impeller driven at 300 revolutions per minute.

EXAMPLE 3

Isolation

The 300 liters of harvested mash was filtered. The filtrate was adjusted to pH 7.0 with dilute sodium hydroxide and extracted with 150 liters of chloroform. The resulting extract was concentrated to dryness under vacuum at a temperature below 40° C. The residual mass was dissolved in about 1 liter of chloroform. The solution was filtered, mixed with 2 liters of acetone and maintained at 4° C. for 20 hours. The 58 gm. of crystalline 2-(3,8-dioxatricyclo[5.1.0.0$^{2,4}$]oct-5-en-5-yl) - 4H - pyran-4-one which separated was filtered off, washed with a small volume of acetone, and dried in vacuo at room temperature. The product was isolated as colorless needles, melting point 148° C. (decomposition); U.V.

$\lambda_{max.}^{CH_3OH}$ 269 nm. ($\epsilon$ 16,800);

$[\alpha]_D^{25}$ = −123 (c. 0.591 CHCl$_3$).

EXAMPLE 4

Preparation of 2-(1,4-dioxocin-6-yl)-4H-pyran-4-one

A 5 gm. portion of 2-(3,8-dioxatricyclo[5.1.0.0$^{2,4}$]oct-5-en-5-yl)-4H-pyran-4-one (I) was dissolved in 100 ml. of acetic anhydride and heated on a steam bath for 50 minutes. The reaction mixture was cooled to room temperature, poured into 1200 ml. of ice water, allowed to stand at room temperature for one hour to decompose the acetic anhydride and then evaporated in vacuo to a semicrystalline residue. The residue was extracted with ethyl acetate to obtain a soluble fraction containing 3 gm. of the desired product as identified by thin layer chromatography and IR spectrum.

EXAMPLE 5

Purification of 2-(1,4-dioxocin-6-yl)-4H-pyran-4-one

A 4.8 gm. portion of crude product, prepared as described in Example 1, was dissolved in a small volume of ethyl acetate and charged onto a 2.4 x 27 cm. column of 60–200 mesh silica gel (Davison Chemical Company). The column was eluted with ethyl acetate with a flow rate of 90 ml. per hour. The product eluted from this column in 126–207 ml. of effluent. Concentration of this fraction in vacuo yielded 3.152 gm. of light tan crystalline product. This material was recrystallized from ethyl acetate to yield pure colorless 2-(1,4-dioxocin-6-yl)-4H-pyran-4-one, M.P. 84°–87° C., $\lambda_{max.}^{CH_3OH}$ 268 nm. ($\epsilon$ 13,100), m/e 204.0411 (calculated for C$_{11}$H$_8$O$_4$:204.0422).

What is claimed is:

1. The compound 2-(1,4-dioxocin-6-yl)-4H-pyran-4-one represented by the formula:

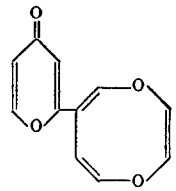

2. The process of preparing 2-(1,4-dioxocin-6-yl)-4H-pyran-4-one which comprises heating 2-(3,8-dioxatricyclo[5.1.0.0$^{2,4}$]oct-5-en-5-yl)-4H-pyran-4-one in acetic anhydride at a temperature of from about 7.5 C. to about 110° C. for a period of time sufficient for a substantial degree of rearrangement to occur.

No references cited.

NORMA S. MILESTONE, Primary Examiner

M. A. M. CROWDER, Assistant Examiner

U.S. Cl. X.R.

260—345.9; 424—283

UNITED STATES PATENT OFFICE
CERTIFICATE OF CORRECTION

Patent No. 3,770,773          Dated November 6, 1973

Inventor(s) Donald Bruce Borders and John Edgar Lancaster

It is certified that error appears in the above-identified patent and that said Letters Patent are hereby corrected as shown below:

Column 2, line 20   "inlude" should be -- include --.

Column 3, line 73   "(II)" should be -- (I) --.

Column 3, line 75   "material has $\alpha_D$-123°C." should be
-- "antibiotic has $[\alpha]_D^{25} = -123°$ --.

Column 5, line 36   "-123 (C 0.591 CHCl$_3$)" should be
-- -123° (C=0.591 CHCl$_3$) --.

Column 6, line 36   "7.5°C." should be -- 75°C. --.

Signed and sealed this 20th day of August 1974.

(SEAL)
Attest:

McCOY M. GIBSON, JR.                C. MARSHALL DANN
Attesting Officer                    Commissioner of Patents